(12) United States Patent
Ruud et al.

(10) Patent No.: US 7,476,703 B2
(45) Date of Patent: Jan. 13, 2009

(54) IN-SITU METHOD AND COMPOSITION FOR REPAIRING A THERMAL BARRIER COATING

(75) Inventors: James A. Ruud, Delmar, NY (US); Kevin H. Janora, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 743 days.

(21) Appl. No.: 11/031,166

(22) Filed: Jan. 6, 2005

(65) Prior Publication Data

US 2005/0118331 A1 Jun. 2, 2005

Related U.S. Application Data

(62) Division of application No. 10/420,265, filed on Apr. 22, 2003, now Pat. No. 6,875,464.

(51) Int. Cl.
*C08K 3/22* (2006.01)
(52) U.S. Cl. .................................... 524/413; 524/783
(58) Field of Classification Search ............... 524/413, 524/783
See application file for complete search history.

(56) References Cited

U.S. PATENT DOCUMENTS

| | | | |
|---|---|---|---|
| 5,759,932 A | 6/1998 | Sangeeta et al. | |
| 5,985,368 A | 11/1999 | Sangeeta et al. | |
| 6,235,352 B1 | 5/2001 | Leverant et al. | |
| 6,294,261 B1 * | 9/2001 | Sangeeta et al. | 428/469 |
| 6,413,578 B1 | 7/2002 | Stowell et al. | |
| 6,783,866 B1 * | 8/2004 | Greil et al. | 428/626 |
| 7,256,232 B2 * | 8/2007 | Lamaze et al. | 524/430 |

FOREIGN PATENT DOCUMENTS

| | | | |
|---|---|---|---|
| EP | 1088908 | | 4/2001 |
| EP | 1197585 | | 4/2002 |
| FR | 2 830 857 | * | 4/2003 |
| WO | 01/10791 | * | 2/2001 |

OTHER PUBLICATIONS

Alerine et al., Gov. Res. Announc. Indexx, USA, N95-1976/XAD, Nov. 1994.
Yi et al., Cailiao Baohu, 32(3), pp. 17-19, 1999.
Curtis, Power Engineering, 104(1), pp. 32,34, Jan. 2000.

* cited by examiner

*Primary Examiner*—Margaret G Moore
(74) *Attorney, Agent, or Firm*—Paul J. DiConza

(57) ABSTRACT

An in-situ method for repairing a thermal barrier coating deposited on a component that has suffered localized spallation including depositing a ceramic paste on a surface area of the component exposed by the localized spallation, the ceramic paste including a ceramic material in a binder material, the ceramic material including solid zirconia particles, the binder material including a silicone compound. The method also including heating the binder material to yield a repair coating that covers the surface area of the component, the silicone compound promoting the bonding of the solid zirconia particles.

15 Claims, 5 Drawing Sheets

IN-SITU METHOD AND COMPOSITION FOR REPAIRING A THERMAL BARRIER COATING

CROSS-REFERENCE TO RELATED APPLICATION

This application is a divisional application of Ser. No. 10/420,265 U.S. Pat. No. 6,875,464 filed on Apr. 22, 2003, which is hereby incorporated by reference in its entirety.

FIELD OF THE INVENTION

The present invention relates generally to thermal barrier coatings for components exposed to high temperatures, such as components exposed to the hostile thermal environment of a gas turbine engine or the like. More specifically, the present invention relates to methods and compositions for repairing a thermal barrier coating that has suffered localized spallation.

BACKGROUND OF THE INVENTION

Higher operating temperatures for gas turbine engines and the like are continuously sought in order to increase their efficiency. However, as operating temperatures increase, the high-temperature durability of the components of the turbine must correspondingly increase. Significant advances in high-temperature capabilities have been achieved through the formulation of nickel, cobalt and iron-based superalloys. These superalloys may be designed to withstand temperatures in the range of about 1000 to 1100 degrees C. or higher. Nonetheless, when used to form components of the turbine, such as combustor liners, augmentor hardware, shrouds and high and low-pressure nozzles and blades, the superalloys are often susceptible to damage by oxidation and hot corrosion attack and may not retain adequate mechanical properties. For this reason, these components are typically protected by an environmental and/or thermal-insulating coating, the latter of which is referred to as a thermal barrier coating (TBC). Ceramic materials, and particularly yttria-stabilized zirconia (zirconium oxide) (YSZ), are widely used as TBCs. These materials are employed because they may be readily deposited by plasma-spraying, flame-spraying and physical vapor deposition (PVD) techniques, and because they generally exhibit desirable thermal characteristics. In general, these TBCs may be utilized in conjunction with the superalloys in order to reduce the cooling air requirements associated with a given turbine.

In plasma-spraying, an electric arc is typically used to heat various gasses, such as air, nitrogen or hydrogen, to a temperature of about 8000 degrees C. or higher. These gasses are expelled from an annulus at high velocity, creating a characteristic flame. Powder material is fed into the flame and the melted particles are accelerated toward the substrate being coated. In PVD, an ingot of a ceramic material being deposited on the substrate is placed in an evacuated chamber. The top end of the ingot is heated by an intense heat source, such as an electron beam or laser, such that it melts and forms a pool. A portion of the hot, molten ceramic evaporates and condenses on the substrate, and a coating is gradually formed as the ingot is raised to replenish the pool. The coatings resulting from plasma-spraying and PVD are typically of good quality and durability. However, localized spallation of a TBC may occasionally occur during the manufacturing process, regardless of the technique utilized, due to surface contamination, handling damage or the like.

In order to be effective, TBCs must have low thermal conductivity, must strongly adhere to the component and must remain adhered through many heating and cooling cycles. The latter requirement is particularly demanding due to the different coefficients of thermal expansion between the ceramic materials and the superalloy substrates that they protect. To promote adhesion and extend the service life of a TBC, an oxidation-resistant bond coating is often employed. A bond coating typically takes the form of an overlay coating, such as MCrAlX (where M is iron, nickel and/or cobalt and X is yttrium or another rare earth element), or a diffusion aluminide coating, such as nickel aluminide or platinum-modified nickel aluminide. During the deposition of the TBC and subsequent exposures to high temperatures, such as during turbine operation, these bond coatings form a tightly adherent alumina (aluminum oxide) ($Al_2O_3$) layer or scale that adheres the TBC to the bond coating.

The service life of a TBC is typically limited by a spallation event brought on by thermal fatigue, contaminants present during the coating process, contact during turbine manufacture/assembly/operation, erosion, metallurgical issues, etc. Accordingly, a significant challenge has been to obtain a more adherent ceramic layer that is less susceptible to spalling when subjected to thermal cycling and the like. Though significant advances have been made, there is the inevitable requirement to repair components whose TBCs have spalled. Though spallation typically occurs in localized regions or patches, the conventional repair method has been to completely remove the TBC (after removing the affected component from the turbine or the like), restore or repair the bond coating as necessary and recoat the entire component, especially when plasma-spraying or PVD techniques which do not work well in constricted areas are utilized. Techniques for removing TBCs include grit-blasting and chemical stripping with an alkaline or caustic solution at high temperatures and pressures. Grit-blasting, however, is a time-consuming, labor-intensive, expensive process and often erodes the surface beneath the coating. With repetitive use, grit-blasting may eventually destroy the component. The use of an alkaline or caustic solution to remove a TBC is also less than ideal, since the process requires the use of an autoclave operating at high temperatures and pressures. Consequently, conventional repair methods are time-consuming, labor-intensive and expensive, and may be difficult to perform on components with complex geometries, such as airfoils and shrouds.

As an alternative to the processes described above, U.S. Pat. No. 5,723,078 to Nagaraj et al. discloses selectively repairing a spalled region of a TBC by texturing the exposed surface of the bond coating and depositing a ceramic material on the textured surface by plasma-spraying. While avoiding the necessity of stripping the entire TBC from a component, the repair method requires the removal of the component from the turbine in order to deposit the ceramic material. Thus, masking and over-spraying problems arise and time, effort and money are wasted.

In the case of large power-generation turbines, completely halting power generation for an extended period of time in order to remove components whose TBCs have suffered only localized spallation is not economically desirable. As a result, components identified as having a spalled TBC are often analyzed to determine whether the spallation has occurred in a high-stress area. A judgment is then made as to the risk of damage to the turbine due to the reduced thermal protection of the component, which if excessive may lead to catastrophic failure of the component. If the decision is made to continue operation, the spalled component must typically be scrapped at the end of operation because of the thermal damage inflicted while operating the component without complete TBC coverage.

As another alternative to the processes described above, U.S. Pat. Nos. 5,759,932 and 5,985,368 to Sangeeta et al. disclose a TBC patch formed from a slurry composition including hollow spheres of zirconia contained within a porous oxide matrix derived from silica, such as aluminosilicate. The preferred matrix material is mullite ($3Al_2O_3 2SiO_2$). The TBC patch method includes applying a slurry base coating having about 0 to 40% zirconia spheres by weight and one or more slurry top coatings each having about 25 to 99% zirconia spheres by weight. Various heat treatments are applied to the base coating and top coatings in order to cure them. While providing a TBC patch with a relatively high thermal expansion coefficient and thermal stability (melting point), along with a relatively low thermal conductivity, this method provides relatively low erosion resistance due to the use of the hollow spheres of zirconia.

As a further alternative to the processes described above, U.S. Pat. No. 6,413,578 to Stowell et al. discloses selectively repairing a spalled region of a TBC by cleaning the surface of the component exposed by the localized spallation and applying a ceramic paste including a ceramic powder in a binder to the surface, the ceramic powder including alumina and zirconia, the binder being a ceramic precursor binder that thermally decomposes to form a refractory material. The binder is heated to yield a repair coating that covers the surface, the repair coating including the ceramic powder in a matrix of the refractory material formed by reacting the binder with the alumina, i.e., a network of mullite.

What is still needed, however, is an in-situ repair method that may be performed on localized spalled areas of the TBC of a component of a turbine or the like without necessitating that the component be removed from the turbine, minimizing downtime and scrappage. The TBC patch must have a high thermal expansion coefficient, high thermal stability (a high melting point), low thermal conductivity, good adherence properties and high erosion resistance. In addition, it is desirable to have a TBC patch with a composition that is similar to the composition of the surrounding, unspalled TBC, in order to closely match the properties of the unspalled TBC. Thus, what is needed is a repair method that does not utilize hollow spheres of zirconia and that does not necessitate the formation of a network of a second ceramic phase through the reaction of silica with additional ceramic powders including alumina. The TBC patch should be able to be cured at a wide range of temperatures and under a wide range of conditions and the zirconia used should remain as a solid.

BRIEF SUMMARY OF THE INVENTION

In various embodiments, the present invention provides engineered particle distributions of fine and coarse yttria-stabilized zirconia (zirconium oxide) (YSZ) particles that are suspended in an organic binder including, for example, denatured ethanol, a polyalkylene glycol monobutyl ether and a silicone resin. The composition is tailored for a rheology that may be applied as a paste or putty to localized spalled areas of the thermal barrier coating (TBC) of a component of a turbine or the like. After application, the paste is dried and cured at low temperatures, attaining a tensile strength comparable to that of the surrounding TBC. Upon heating to operating temperatures, the TBC patch retains its mechanical strength and erosion resistance. This in-situ method alleviates the disassembly, masking and over-spraying problems associated with conventional TBC repair methods.

In one embodiment of the present invention, a method for repairing a thermal barrier coating deposited on a component that has suffered localized spallation includes depositing a ceramic paste on a surface area of the component exposed by the localized spallation, the ceramic paste including a ceramic material in a binder material, the ceramic material including solid zirconia particles, the binder material including a silicone compound. The method also includes heating the binder material to yield a repair coating that covers the surface area of the component, the silicone compound promoting the bonding of the solid zirconia particles.

In another embodiment of the present invention, a composition for repairing a thermal barrier coating deposited on a component that has suffered localized spallation includes a ceramic paste including a ceramic material in a binder material, the ceramic material including solid zirconia particles, the binder material including a silicone compound, the binder material yielding a repair coating that covers a surface area of the component upon heating, the silicone compound promoting the bonding of the solid zirconia particles.

In a further embodiment of the present invention, a method of making a composition for repairing a thermal barrier coating deposited on a component that has suffered localized spallation includes providing a primer material including a first ceramic material in a binder material, the first ceramic material including first solid zirconia particles, the binder material including a silicone compound. The method also includes mixing the primer material with a second ceramic material to yield a ceramic paste, the second ceramic material including second solid zirconia particles, the ceramic paste yielding a repair coating that covers a surface area of the component upon heating, the silicone compound promoting the bonding of the first and second solid zirconia particles.

DETAILED DESCRIPTION OF THE INVENTION

The present invention is directed to components protected by thermal barrier coatings (TBCs) for operation within environments characterized by relatively high temperatures, and therefore subjected to severe thermal stresses. Such components include those used in gas turbine engines and the like.

Figure 1:
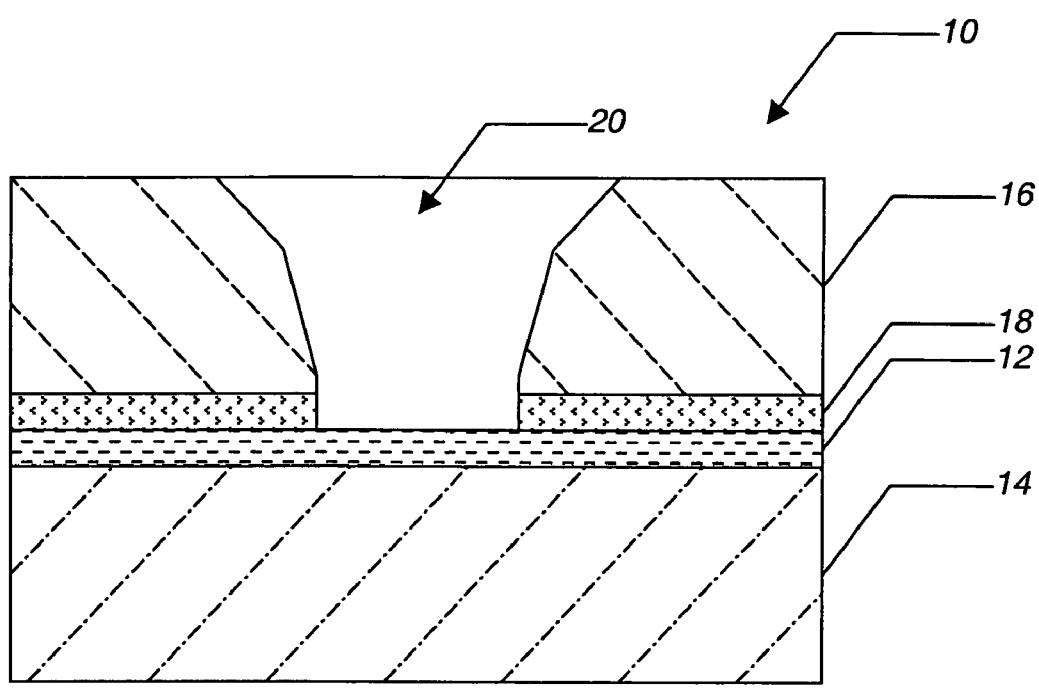
FIG. 1 is a cross-sectional side view of a typical thermal barrier coating (TBC) system associated with a component of a gas turbine engine or the like, the TBC system having suffered localized spallation.

Referring to FIG. 1, a typical TBC system 10 includes a bond coating 12 deposited on the surface of a component 14. A ceramic layer 16 is deposited on the surface of the bond coating 12 and acts as the TBC. The component 14 may be formed from a nickel, cobalt or iron-based superalloy or the like. The bond coating 12 may be formed from a metallic oxidation-resistant material, so as to protect the underlying component 14 from oxidation and enable the ceramic layer 16 to more effectively adhere to the component 14. Suitable bond coatings 12 include MCrAlX overlay coatings (where M is iron, nickel and/or cobalt and X is yttrium or another rare earth element) and diffusion aluminide coatings. Following the deposition of the bond coating 12 on the surface of the component 14, an oxide scale 18 may form on the surface of the bond coating 12 at elevated temperatures. The oxide scale 18 provides a surface to which the ceramic layer 16 more effectively adheres, thereby promoting the spallation resistance of the ceramic layer 16.

The ceramic layer 16 may be deposited by plasma-spraying, flame-spraying or physical vapor deposition (PVD) techniques. A preferred material for the ceramic layer 16 is yttria-stabilized zirconia (zirconium oxide) (YSZ), with a preferred composition being about 4 to 8 wt. % yttria, although other ceramic materials may be utilized, such as yttria, non-stabilized zirconia, or zirconia stabilized by magnesia (MgO), ceria ($CeO_2$), scandia ($Sc_2O_3$) and/or other oxides. The ceramic layer 16 is deposited to a thickness that is sufficient to provide the required thermal protection for the component 14, typically between about 50 and 1500 microns for most turbines.

In an operating turbine, the surfaces of the component 14 are subjected to hot combustion gasses, and are therefore subjected to attack by oxidation, corrosion and erosion. Accordingly, the component 14 must remain protected from this hostile operating environment by the TBC system 10. Loss of the ceramic layer 16, as well as the bond coating 12, due to spallation brought on by thermal fatigue, contaminants present during the coating process, contact during turbine manufacture/assembly/operation, erosion and/or metallurgical issues may lead to premature, and often rapid deterioration of the component 14. A localized spalled region 20 of the ceramic layer 16 is illustrated in FIG. 1. According to the present invention, each of the steps described herein performed in the repair of the spalled region 20 may be performed while the component 14 remains installed in the turbine, thereby completely avoiding the need to remove and later reinstall the component 14.

The repair process begins with cleaning the surface exposed by the localized spalled region 20 so as to remove loose oxides and contaminants, such as grease, oils and soot. While various techniques may be used, one preferred technique is to remove loose material from the spalled region 20 and clean the surface with air, water (using a waterjet or the like), a detergent solution and/or alcohol or acetone. This step may be selectively performed to ensure that the surrounding, undamaged ceramic layer 16 is not subjected to the procedure.

Figure 2:
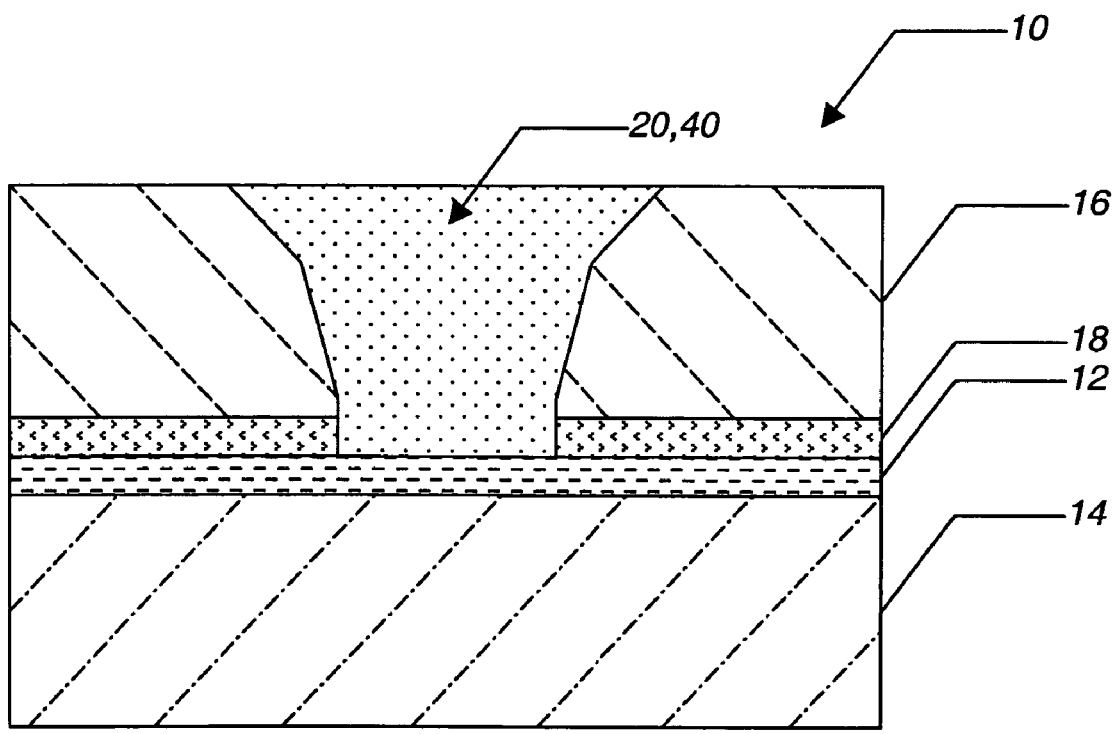
FIG. 2 is a cross-sectional side view of a typical TBC system associated with a component of a gas turbine engine or the like, the localized spallation in the TBC system having been repaired using the in-situ methods and the TBC patch composition of the present invention.

Once free of contaminants, the spalled region 20 is filled with a ceramic paste or putty 40, as illustrated in FIG. 2. In one embodiment of the present invention, the ceramic paste 40 includes a carefully engineered particle distribution of fine (less than about 1-micron) 8YSZ and coarse (between about 30 and 50-micron) 8YSZ particles suspended in an organic binder. The organic binder includes, for example, denatured ethanol (EM Science, Inc.), UCON Lubricant 50-HB-2000 (Dow Chemicals) (a polyalkylene glycol monobutyl ether) and SR350 or SR355 silicone resin (GE Silicones). Other organic binder formulations may, however, be utilized. For example, other suitable organic solvents include propanol, methanol, methyl ethyl ketone and toluene. Other suitable organic lubricants include glycerine, cellulose and polyvinyl alcohol. Optionally, prior to filling the spalled region 20 with the ceramic paste 40, a low-viscosity primer layer may be painted onto the spalled region 20. This primer layer may be prepared from, for example, denatured ethanol, UCON Lubricant 50-HB-2000, SR350 or SR355 silicone resin, and MELox 5Y YSZ (Magnesium Elektron, Inc.) (about 8% yttria content, about 0.5 micron average particle size). The ceramic paste 40 may then be troweled onto the primer layer and into the spalled region 20. The ceramic paste 40 may be prepared by hand-mixing the primer material with ZY-8 fused YSZ (Muscle Shoals Minerals, Inc.) (about 45 microns average particle size, about 270 mesh) or the like. In general, the ceramic paste 40 should be in the form of a siloxane putty that turns to silica and acts as a bonding agent at relatively low temperatures. For example, about 7% silica by volume is acceptable. Preferably, the YSZ used is in the form of solid (at all times), angular particles, as opposed to hollow spheres, providing improved erosion resistance of the resulting TBC patch.

Once applied, the TBC patch is allowed to dry at about room temperature to less than 100 degrees C., preferably at about 65 to 70 degrees C., removing any solvent with a relatively high vapor pressure. The drying temperature should be low enough that violent volatilization and bubbling of the TBC patch are avoided. Following drying, the silicone resin is transformed to silica with relatively high strength by heat treatment at about 300 to 700 degrees C., preferably at about 450 degrees C. At the operating temperature of the turbine, about 900 to 1300 degrees C., preferably about 1100 degrees C., the silica bonds are formed and the TBC patch fully cures.

In general, the methods and compositions of the present invention do not use alumina and silica to form a mullite phase ceramic, i.e., a silica matrix or network, in which the zirconia particles are embedded. Rather, the zirconia particles are bonded by silica. This may occur in one of two ways: 1) a silica interface may be created, providing a layer of silica between the zirconia particles or 2) a zircon ($ZrSiO_4$) interface may be created, i.e., the zirconia particles may chemically bond, with the silica acting as a sintering agent. Thus, the compositions of the present invention display favorable tensile adhesion strength and erosion characteristics.

Experimental Procedure

The following experimental procedures and exemplary methods and compositions are provided for illustration purposes only, and are in no way intended to limit the scope of the present invention. It should be noted that all testing results, even if not apparently preferable in one context or application, may reflect preferable characteristics in other contexts or applications and/or may be offset by preferable testing results with respect to other characteristics.

The TBC patch was generally applied in two (2) layers. First, a low-viscosity primer layer of about 1 to 3 mil thickness was painted onto a substrate. Second, a cement paste or putty of about 20 to 50 mil thickness was troweled onto the primer layer and the substrate. The primer layer was prepared from the following ingredients, although, as described herein, other formulations may be utilized: about 12 g denatured ethanol (EM Science, Inc.); about 4 g UCON Lubricant 50-HB-2000 (Dow Chemicals) (a polyalkylene glycol monobutyl ether); about 9.3 g SR350 silicone resin (GE Silicones); and about 45.3 g MELox 5Y YSZ (Magnesium Elektron, Inc.) (about 8% yttria content, about 0.5 micron average particle size). These ingredients were placed in a Nalgene bottle, along with several ¼-inch diameter zirconia milling media, and mixed on a paint shaker for about 20 minutes. The cement paste was prepared by hand-mixing about 20 g of the primer material with about 50 g of ZY-8 fused YSZ (Muscle Shoals Minerals, Inc.) (about 25 microns average particle size, about 270 mesh).

The substrates used were about 1-inch diameter disks of Inconel 718 or Rene N5 superalloys. NiCrAlY bondcoats or porous YSZ TBC were plasma-sprayed atop the superalloy base for most of the substrates. In applying the cement paste to the substrates, the substrates were first press-fitted into about a 1-inch diameter hole in a Teflon mold. The top surface of each of the substrates remained beneath the Teflon surface, creating a gap of about 20 to 50 mil. After the primer material was painted on, the cement paste was troweled into this gap and a razor blade was used to create a uniformly thick cement layer atop each of the substrates. Alternatively, the porous YSZ TBC was grit-blasted out from the center of each of the substrates, leaving about a 1 mm or larger ring of TBC on the outer rim. After the primer material was painted on, the cement paste was troweled into these voided areas. A razor blade was again wiped across each of the substrates to create a smooth cement layer of uniform thickness.

About a 2-hour drying of the as prepared specimens at about 25 degrees C. was found to be adequate for samples with about a 20 to 30 mil thick layer of cement. Inadequate drying resulted in blisters forming on the samples. Following drying, the samples were cured at about 450 degrees C. in air for about 10 to 30 minutes (about 100 degrees C. per minute ramp-up). Many of the samples received a final firing at about 1100 degrees C. in air for about 30 minutes (about 100 degrees C. per minute ramp-up).

Tensile testing of the samples was performed using a modification of the Standard Test Method for Adhesion or Cohesive Strength of Flame-Sprayed Coatings (ASTM C633). About a 0.75 or 1-inch diameter steel stud was bonded to either side of each substrate disk using FM1000 epoxy. As per ASTM C633 specifications, the studs were then pulled apart with increasing force until the cement coating failed.

Figure 3:
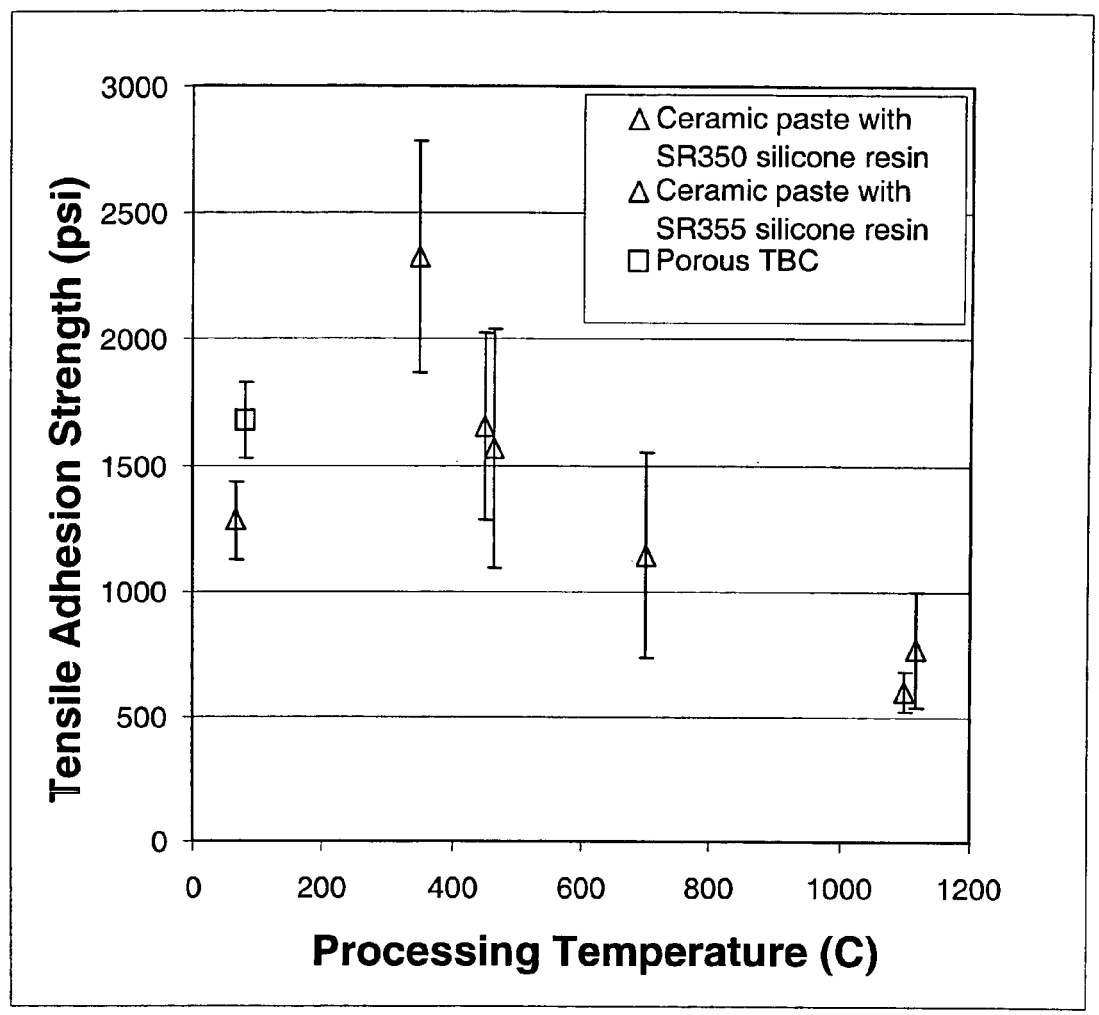
FIG. 3 is a graph illustrating the tensile adhesion strength of several TBCs as a function of the maximum temperature to which the TBCs were exposed after drying.

The results of the tensile testing are illustrated in FIG. 3. FIG. 3 illustrates the tensile adhesion strength of several coatings as a function of the maximum temperature that the coatings were exposed to after drying. The standard cement formulation described above is indicated by "SR350" in the figure, while "SR355" refers to the standard cement formulation with SR355 substituted for SR350 on a 1:1 by weight basis. "Porous TBC" is the plasma-spray deposited YSZ TBC, with "vacuum heat treated" referring to the standard vacuum heat treatment that these TBC coatings were subjected to after plasma-spray deposition. The substrates that the cement coatings were bonded to were a NiCrAlY metallic bondcoat. The cement thickness was about 20 to 25 mils. The TBC thickness was also about 20 to 25 mils.

The tensile adhesion strength of both the SR350 and SR355 cements peaked at about 400 degrees C. and declined with increasing temperature. One conjecture is that the mismatch in the thermal expansion coefficients between the cement and the metallic substrate resulted in increasing stresses detrimental to the tensile adhesion strength as the temperature increased. After firing at about 1100 degrees C., the cements better adhered to the TBC surface. This may have been due to better cement bonding to the zirconia TBC or the thermal expansion coefficient mismatch being mitigated by the TBC interlayer. The adhesion of the SR350 and SR355 cements to very rough virgin NiCrAlY bondcoats, very smooth IN718 and heavily oxidized NiCrAlY were all between about 800 and 950 psi. Thus, the different surface roughnesses of these metallic substrates appeared to have little effect on the tensile adhesion strength. Samples that were surface-ground down to about 20 to 25 mils from an original cement thickness of about 30 to 40 mils had lower tensile adhesion strength (about 30% lower) than samples that were cast at the 20 to 25 mil thickness and not subsequently surface-ground.

Figure 4:
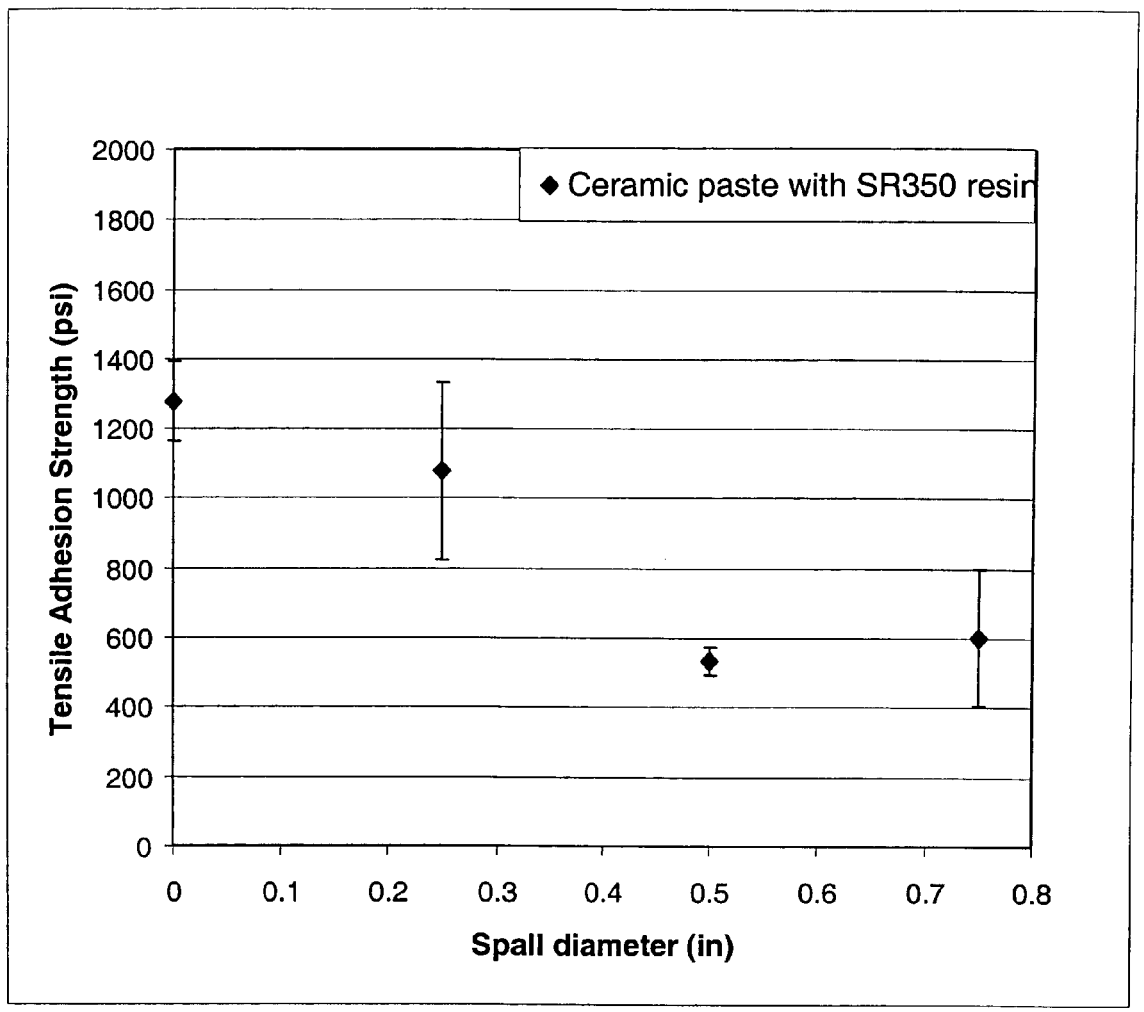
FIG. 4 is a graph illustrating the tensile adhesion strength of one embodiment of the TBC patch of the present invention after firing at about 1100 degrees C. and as applied to spalled regions of varying size.

To simulate spalls in a TBC coating, the central portions of about 24 mil thick porous YSZ TBC-coated buttons were grit-blasted away to varying degrees. The grit-blasted portions were then filled with the standard SR350 formulation described above, fired at about 1100 degrees C. and the tensile adhesion strength was tested, as illustrated in FIG. 4. Having a portion of the TBC available to bond to appeared to increase the total adhesion of the patch.

Erosion testing of the samples was performed using an S.S. White Airbrasives 6500 grit-blaster with a Plasmadyne powder-feeder. The about 0.26-inch diameter sapphire nozzle was mounted about 0.5 inch from each of the cement-coated samples at an angle of about 90 degrees, perpendicular to their surfaces. About 2.8 g/minute of #3 S.S. White Accubrade 50 alumina (about 50 microns average particle size) was used as the abrasive media with a nitrogen carrier flow rate of about 6 lpm. Erosion testing occurred for about 10 to 50 seconds, all at about 25 degrees C.

Figure 5:
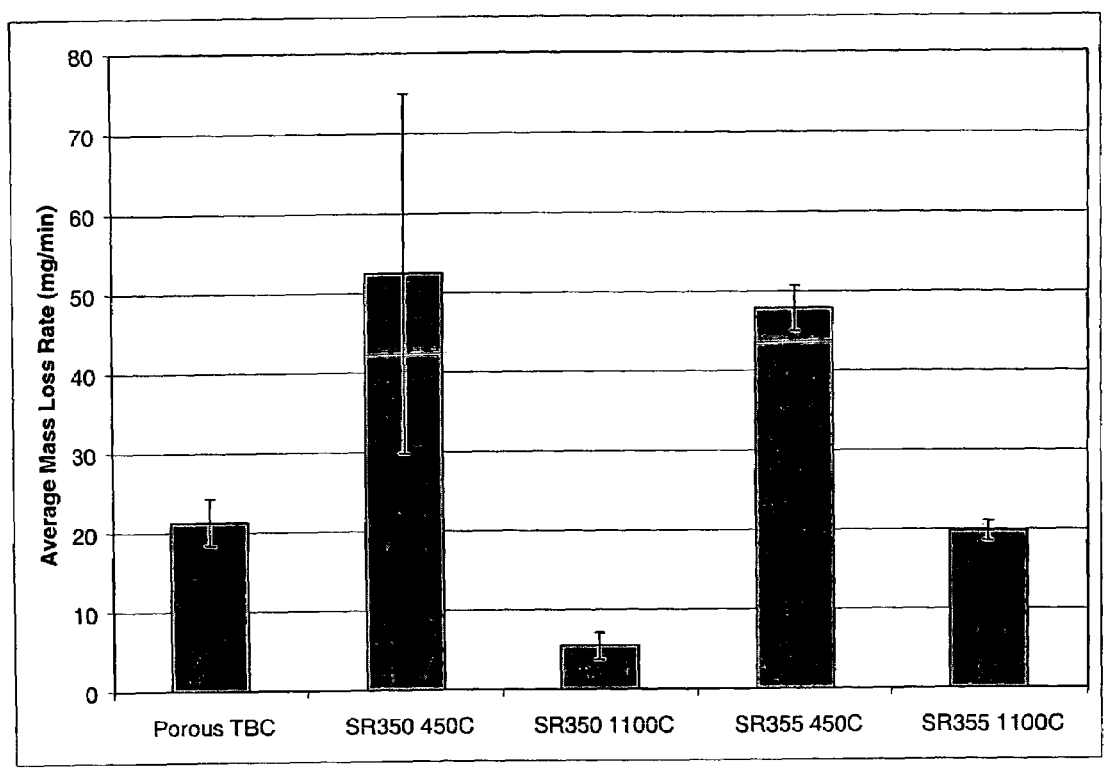
FIG. 5 is a graph illustrating the erosion resistance of several TBCs.

The results of the erosion testing are illustrated in FIG. 5. Again, the standard cement formulation described above is indicated by "SR350" in the figure, while "SR355" refers to the standard cement formulation with SR355 substituted for SR350 on a 1:1 by weight basis. "450 C" and "1100 C" refer to the maximum temperature that the cements were exposed to after drying. "Porous TBC" is the plasma-spray deposited YSZ TBC. "Slurry B" was an attempt to reproduce the TBC patch Slurry B topcoat described in U.S. Pat. No. 5,985,368, although with less ethanol and without plasma-spray deposition. In general, Slurry B had lower erosion resistance than the SR350 or SR355 formulations due to the replacement of the Sulzer Metco hollow YSZ spheres in Slurry B with the hard, angular particles of Muscle Shoals YSZ in the SR350 and SR355 formulations. Other solid particles of YSZ, such as those from Zircoa or Atlantic Equipment Engineers (AEE), may also be used with varying degrees of success. As viewed under a microscope, the hard fused crystalline "shards" of the Muscle Shoals YSZ distinguished it from the rounder and softer particles of other vendors.

Erosion-resistance data for other cements, ceramics and glasses are included in Table 1. All data were obtained under the same erosion test specifications described above. All samples were fired to about 1100 degrees C. prior to testing. The use of angular YSZ particles, as supplied by the Muscle Shoals powder, provided the lowest mass loss rates. It should be noted that exposing the cements briefly to the flame of a natural gas/oxygen torch may also result in improved erosion resistance.

TABLE 1

Other Erosion-Resistance Data

| Material | Average Mass Loss Rate (mg/min) |
|---|---|
| −200 + 325 mesh Muscle Shoals YSZ in standard formulation | 8 |
| −100 + 200 mesh Muscle Shoals YSZ in standard formulation | 9 |
| −60 + 100 mesh Muscle Shoals YSZ in standard formulation | 3 |
| +60 mesh Muscle Shoals YSZ in standard formulation | 13 |
| −100 + 200 mesh Zircoa YSZ in standard formulation | 62 |
| −100 + 200 mesh solid AEE alumina in standard formulation | 5 |
| Slurry B with 3X concentration of hollow YSZ spheres | 206 |
| Norton hollow YSZ spheres in standard formulation | 86 |

TABLE 1-continued

Other Erosion-Resistance Data

| Material | Average Mass Loss Rate (mg/min) |
|---|---|
| Cotronics 904 Zirconia cement | 110 |
| 25% Norton spheres Cotronics 904 cement | 89 |
| Zyp Z-Prime Aluminum Phosphate cement | 210 |
| Cotronics 906 Magnesia cement | 58 |
| Secar 80 Calcium Aluminate cement | 21 |
| DVC-type plasma-sprayed YSZ TBC | 4 |
| Fused silica slide | 7 |

Various modifications to the standard cement mixture(s) described above were also performed and tested in an attempt to improve the tensile adhesion strength and reduce the processing time of the TBC patch.

SR350 resin is a silanol-terminated, methyl polysilsesquioxane. SR355 resin, a phenylmethyl polysilsesquioxane, was used as a 1:1 by weight replacement in the standard formulation. In general, the tensile adhesion strength of the specimens prepared with SR355 was comparable to those prepared with SR350. Erosion testing, however, showed differences in the specimens prepared after firing at about 1100 degrees C. Samples of each of the virgin resins were heated in air to about 800 degrees C. By about 200 degrees C., both samples had melted without obvious decomposition. By about 250 degrees C., both samples had begun to darken and decompose. The SR350 continued to decompose until about 450 degrees C. when the sample became entirely a white powder (amorphous silica). The SR355 also eventually became a white powder, but at a higher temperature of about 700 degrees C. The higher final decomposition temperature of the SR355 may be due to its more thermally stable phenyl groups. Different proportions of SR350 or SR355 resin may also be utilized. A dispersant, such as 1 wt. % Emphol PS21-A, may be added to improve the dispersion of the zirconia in the standard formulation described above.

Toluene was used to replace ethanol on a 1:1 by weight basis with the SR355 formulation described above to determine if the phenyl groups of the SR355 inhibited it from being fully dissolved in the ethanol. Tensile adhesion strength testing after firing at about 1100 degrees C. showed a decrease in adhesion.

The SR350-based cement demonstrates desirable characteristics with respect to tensile adhesion strength as compared to other commercial refractory cements after firing at about 1100 degrees C. because the cement remains relatively plastic until the organic compounds are removed at about 400 degrees C. For example, the cement can be dented with a metal spatula or the like without cracking the coating during the initial curing from about 25 to 400 degrees C. Adhesion-degrading stresses from the thermal expansion coefficient mismatch between the cement and the metal substrate may not begin until above about 400 degrees C. on initial firing. Rather than having a thermal expansion coefficient mismatch over an 1100 degree C. span with a room-hardened cement, the present invention provides a thermal expansion coefficient mismatch over a 700 degree C. span with a cement that remains plastic until about 400 degrees C. The SR350 was replaced with polydiphenylsiloxane (PDPS) (with toluene replacing the ethanol) as the phenyl groups of the PDPS are generally considered to decompose at higher temperatures than the methyl groups of the SR350. Tensile adhesion testing of specimens prepared with 1:1 and 2.5:1 by weight basis replacements of SR350 with PDPS both showed about a 40% decrease in tensile adhesion strength after firing at about 1100 degrees C. at about a 100 degrees C. per minute ramp-up rate. The latter specimens were heated slowly to about 450 degrees C. and then to about 1100 degrees C. (at about a 2 degrees C. per minute ramp-up rate) and showed tensile adhesion strength comparable to the SR350-based cement.

SRP850 (GE Silicones) is a phenylmethyl silicone similar to SR355 with greater flexibility at room temperature and above. Tensile adhesion testing showed about a 30 to 50% decrease in tensile adhesion strength after firing at about 1100 degrees C. with SRP850 replacing either SR350 or SR355 on a 1:1 by weight basis. It should be noted that xylene replaced ethanol in the SRP850 formulations.

Formulations were also prepared using about 40% less ethanol and UCON and about 67% more ethanol and UCON than in the standard formulation described above with varying results. Reducing the amount of UCON by about 75% (to about 1.5 wt. %, typical of dispersants/emulsifiers) allowed the primer to remain well-dispersed despite the reduced UCON level and provided comparable tensile adhesion strength.

Formulations were further prepared using about 1.8 times the amount of MELox 5Y YSZ as in the standard formulation described above, reducing the organic fraction of the cement. Tensile adhesion strength after firing at about 1100 degrees C. varied and, in some cases, an improvement of about 30% resulted.

The ratio of primer material to ZY-8 fused YSZ was increased in order to increase the proportion of binding silica in the resulting cement. The ratio of primer material to aggregate was increased from about 0.29 in the standard formulation described above to about 0.36 and 0.43. Both increased ratios showed increased tensile adhesion strength. Optionally, a volatile organic filler material may be added to increase the viscosity of this formulation.

The MELox 5Y YSZ in the primer layer was replaced with magnesia to produce a primer layer with a thermal expansion coefficient substantially between that of the standard formulation described above and the metallic bondcoat. The zirconia in the primer layer has a liner thermal expansion coefficient of about $10 \times 10^{-6}/C$ and the magnesia has a linear thermal expansion coefficient of about $13.5 \times 10^{-6}/C$. The MELox 5Y YSZ may also be replaced, to varying degrees, with fine zirconium metal and Sasol Dispal 11N7-80 boehmite powders. Likewise, the 1100 degrees C.-fired standard formulation described above may be reinfiltrated with an SR350/ethanol solution or a Cotronics 904 sodium silicate binder.

Although the present invention has been illustrated and described with reference to preferred embodiments and examples thereof, it will be readily apparent to those of ordinary skill in the art that other embodiments and examples may perform similar functions and/or achieve similar results. All such equivalent embodiments and examples are within the spirit and scope of the present invention and are intended to be covered by the following claims.

What is claimed is:

1. A composition for repairing a thermal barrier coating deposited on a component that has suffered localized spallation comprising:

a ceramic paste comprising a ceramic material in a binder material, the ceramic material comprising solid yttria stabilized zirconia particles that are angular and fused, the binder material comprising a silicone compound, wherein the solid yttria stabilized zirconia particles comprise a first population of particles having an average diameter less than 1.0 micron, and a second population of particles having an average diameter between about 30 and 50 microns.

2. The composition of claim 1, wherein the binder material further comprises an organic binder material.

3. The composition of claim 2, wherein the organic binder material comprises an organic solvent.

4. The composition of claim 2, wherein the organic binder material comprises an organic lubricant.

5. The composition of claim 2, wherein the organic binder material comprises a silicone resin.

6. The composition of claim 1, wherein the binder material yields the repair coating upon drying at about room temperature to less than 100 degrees C.

7. The composition of claim 1, wherein the binder material yields the repair coating upon heating to about 300 to 700 degrees C.

8. The composition of claim 1, wherein the binder material yields the repair coating upon heating to about 900 to 1300 degrees C.

9. The composition of claim 1, further comprising a primer material comprising a ceramic material in a binder material, the ceramic material comprising solid yttrium stabilized zirconia particles, the binder material comprising a silicone compound.

10. The composition of claim 9, wherein the binder material further comprises an organic binder material.

11. The composition of claim 10, wherein the organic binder material comprises an organic solvent.

12. The composition of claim 10, wherein the organic binder material comprises an organic lubricant.

13. The composition of claim 10, wherein the organic binder material comprises a silicone resin.

14. The composition of claim 1, wherein the component comprises a material selected from the group consisting of a nickel-based superalloy, a cobalt-based superalloy and an iron-based superalloy.

15. The composition of claim 1, wherein the component is disposed within a gas turbine engine.

* * * * *

UNITED STATES PATENT AND TRADEMARK OFFICE
CERTIFICATE OF CORRECTION

PATENT NO. : 7,476,703 B2
APPLICATION NO. : 11/031166
DATED : January 13, 2009
INVENTOR(S) : Ruud et al.

It is certified that error appears in the above-identified patent and that said Letters Patent is hereby corrected as shown below:

In Column 8, Line 21, delete "Ipm." and insert -- lpm. --, therefor.

In Column 8, Line 38, delete "Zircoa" and insert -- Zirconia --, therefor.

In Column 8, Line 63, delete "Zircoa" and insert -- Zirconia --, therefor.

Signed and Sealed this

Twenty-fourth Day of March, 2009

JOHN DOLL
*Acting Director of the United States Patent and Trademark Office*